United States Patent Office 3,834,964
Patented Sept. 10, 1974

3,834,964
PROCESSING OF A MULTIPLICITY OF WEBS TO ENHANCE THE MANUFACTURE OF MULTI-COMPONENT LAMINATES
Elmer Paul Blasing, Jr., Cincinnati, Ohio, assignor to Formica Corporation, Cincinnati, Ohio
No Drawing. Filed Oct. 17, 1972, Ser. No. 298,212
Int. Cl. B32b *31/18;* C09j *5/00*
U.S. Cl. 156—269
9 Claims

ABSTRACT OF THE DISCLOSURE

In the production of heat and pressure consolidated laminates which are impregnated with an impregnating resinous material and then formulated into packs ready for consolidation, a plurality of the same or different webs are simultaneously impregnated with said material and then preferably dried prior to formulation into said packs.

BACKGROUND OF THE INVENTION

The production of decorative laminates, both for indoor and outdoor use, has increased tremendously in recent years. With increased demand for such laminates, manufacturers have been hard pressed to produce and maintain a supply of products. As a result, existing equipment has been used at its theoretical capacity for months at a time and existing facilities have been continually expanded and new plants erected.

Decorative laminates generally contain a plurality of laminae which are heat and pressure consolidated to form a unitary structure. The surface sheet is usually a decorative sheet which may be solid in color or may carry a decorative design thereon such as a wood-grain print, a floral pattern or geometric figures. The decorative sheet is impregnated with a noble thermosetting resin which does not undergo any significant color deterioration during the consolidation step during which it is converted to the thermoset state. The impregnated decorative sheet is then superimposed over one or more core sheets which are generally kraft paper sheets, flakeboard etc. When using sheets, they usually have previously been impregnated with a phenolic thermosetting resin which is also converted to the thermoset state during heat and pressure consolidation. The number of core sheets can be varied very substantially from one or two sheets to as many as nine or more depending upon the desired thickness of the ultimate laminate.

If desired, and particularly when the decorative sheet is a printed design, an overlay sheet is superimposed thereover, the overlay sheet generally being a fine quality alpha-cellulose paper sheet impregnated with the same class of noble thermosetting resin used to impregnate the decorative sheet. After heat and pressure consolidation, the overlay sheet becomes transparentized so as to render the decorative sheet readily observed.

In order to impregnate the overlay sheet, the decorative sheet and the core sheets, it is generally the practice to unwind a mill roll of the material to be impregnated and send it through a conventional material treater which is usually a large tank containing submerged rollers and under which the web passes while traveling through a batch of resin in the tank. Total resin pick-up of the sheet is strictly controlled with metering apparatus and the impregnated web is then (1) passed through large drying ovens, where the solvent is evaporated leaving a dry impregnated paper, (2) cut to appropriate size and (3) stacked for use in preparing packs for consolidation.

The individual sheets are then manually assembled into packs in superimposed relationship from top to bottom as follows: a release sheet; an overlay sheet; a decorative sheet; sufficient core sheets to impart the desired thickness to the laminate; and a back release sheet. These assemblies are then piled in a face-to-face relationship in stacks of thirty or more and the entire bundle is consolidated into thirty or more laminates.

As thinner and thinner webs have become more and more prevalent, the metering of the correct ratio of resin penetrant to web weight has become increasingly difficult with the uniformity thereof being limited by the craftsman who manufactured the mechanical equipment and not by the skill of the equipment operator. The same difficulties have arisen with respect to the drying equipment, where gigantic dryers are employed not because of their ability to remove large volumes of volatiles from the material being dried, but because the time dedicated to drying has become increasingly small due to high machine speeds. Patents exemplifing prior art laminates and methods for their production include U.S. 3,589,974; 3,620,899; 3,660,201 which patents are hereby incorporated herein by reference.

SUMMARY

I have now discovered that the handling of heavier web loads can be accomplished by simultaneously treating a plurality of webs in the same impregnating bath and then preferably drying the resultant impregnated webs. I have also found that two dissimilar webs can be treated according to my novel process without any disadvantageous results. Utilizing my novel process, better productivity of the impregnated webs and better control of the volume of material impregnated and the drying of the webs can be accomplished. The drying apparatus handles the increased load with much more efficiency and utilization of capacity than for lesser webs while the increased web through-put on the metering devices minimizes any non-uniformities in their manufacture. Control of the operation of the entire production facility is enhanced, machine through-put is increased and efficiency is improved while line speeds are relaxed resulting in an improved general machine performance.

Furthermore, since a diversity of materials must be processed, usually each on separate apparatus, and later mated by manual labor in order to make up the desired composite, processing two or more webs simultaneously allows more efficient use of the available mass handling capacity of the equipment and simplifies or eliminates the assembling operation of the plies. A reference teaching a process similar to that disclosed herein is U.S. Pat. No. 3,661,673.

DESCRIPTION OF THE INVENTION INCLUDING PREFERRED EMBODIMENTS

As mentioned above, my novel process comprises simultaneously impregnating a plurality of webs with an impregating material and then preferably, drying the group of webs such as by passing them through a drying or baking oven to remove volatiles or otherwise set the materials.

More specifically, my novel process comprises impregnating two or more webs, either identical or different in character and appearance, simultaneously with an impregnant material in a resin bath or zone and preferably subsequently simultaneously drying the so impregnated webs to remove volatiles or advance the cure thereof.

Any number of webs can be treated accordingly to my novel process with a range of 2–9 being preferred and the webs can be treated separately or in conjunction with one another. That is to say, two or more webs can be individually unrolled and impregnated in the same resin tank over two sets of rollers or the webs can be mated together in superimposed, overlying relationship before or during impregnation over the same set of rollers. Examples of types of webs which may be treated include kraft paper, α-cellulose paper, bleached sulfite, fibrillated acrylic decor sheets, linen, canvas, fiberglass, and the like. Useful impregnating resins or coatings include melamine-formaldehyde resins, urea-formaldehyde resins, epoxies, polyesters etc. see U.S. 2,197,357, hereby incorporated herein by reference. Phenolic resins, generally recognized by those skilled in the art, can also be used in my novel process.

After impregnation, the impregnated webs are then preferably dried. They can be dried in the same condition i.e. mated or apart, or they can be subsequently mated and dried if impregnated apart or separated and dried if impregnated mated. Also, a plurality of webs may be treated mated with the impregnating material and one or more may be impregnated separately but simultaneously. The same is true of the drying operation. It is only critical that the same resin zone, bath etc. be used.

The following examples are set forth for purposes of illustration only and are not to be construed as limitations on the instant invention except as set forth in the appended claims. All parts and percentages are by weight unless otherwise specified.

Example 1

Two continuous alpha-cellulose overlay webs of 29 pounds basis weight (3,000 sq. ft.) of the same width are unwound simultaneously from two mill rolls each mounted on the unwind stand of a conventional material treater. The two webs are mated, one atop the other, and immersed in an aqueous melamine-formaldehyde resin solution, metering techniques being employed to control resin pick-up of each web at 65%. The resultant impregnated web composite is then passed through a conventional drying oven at about 275° F., cut to size and stacked at the dry end. The resultant overlay sheets are easily separated and are obtained in a desirable treated condition with a uniform balance of dried resin being obtained in each ply of paper. The efficiency gain of the process is a 50–70% increase in the productive capacity of the unit when handling the two webs as against the handling of one web equal in weight to one of the webs handled in the composite. Foreign matter pick-up in the two web process is half that of the single web run.

Example 2

Two webs, one an alpha-cellulose overlay sheet and the other a printed, opaque, pigmented pattern sheet are impregnated and dried as set forth in Example 1. The pattern sheet picks up 40% resin. The resultant cut, stacked and treated sheets are not only obtained in a desirable treated condition at an increased through-put for the treating unit as against handling the same webs independently, but the sheets are already interleafed in the order required to prepare a protected surface, printed pattern, decorative panel in a subsequent colating and heat and pressure consolidating operation.

Example 3

Printed decorative paper is processed as described in Example 1, above, however the rolls of material feeding the treating units are of reversed face resulting in the cut plies at the end of the drier being alternately face up-face down. The results of the impregnation and drying are as described in Example 1 except that the pick-up recorded is 40%. In addition, the subsequent step of manually flipping the pattern sheet over in colating press build-ups where both faces of stainless steel plates are used in obtaining high gloss or textured surface decorative laminates is eliminated. Not only are the previously mentioned efficiency and cleanliness features obtained, but a substantial reduction in handling scraps is realized.

Example 4

The procedure of Example 1 is again followed except that two rolls of kraft sheet of 129 pounds basis weight (3000 sq. ft.) are unrolled and passed individually through the material treater which has been fitted with a series of two roller units and filled with phenolic resin. The sheets each experience a pick-up of 30%. The drying oven is equipped with sheet separators. The efficiency gain in the productive capacity of the process is 63%.

Example 5

The procedure of Example 1 is again followed except that four overlay webs are individually impregnated, dried and cut as disclosed therein. The resin treater is equipped with a series of four rollers and the oven is fitted with a sufficient number of sheet separators to keep the webs apart. Again an increase in material handling efficiency is realized.

Example 6

The procedure of Example 1 is again followed except that a commercially available polyester resin is used as a substitute for the melamine/formaldehyde resin thereof. Similar results are achieved.

Example 7

The procedure of Example 1 is again followed except the webs are separated after impregnation and dried separately.

Example 8

The procedure of Example 4 is again followed except that the two webs are mated in a superimposed overlying relationship after impregnation and dried as such.

I claim:
1. A process for the production of a decorative laminate which comprises superimposing from 2–9 cellulosic webs in an overlaying relationship, simultaneously impregnating the resultant superimposed, overlaying cellulosic webs by passing them into a resin bath containing a melamine/formaldehyde or phenol/formaldehyde resin, drying the resultant, impregnated, superimposed webs as such to remove solvent but only partially cure said resin, cutting said impregnated webs into sheets and heat and pressure consolidating said webs, in conjunction with other components, into a decorative laminate.

2. A method according to Claim 1 wherein said webs are identical.

3. A method according to Claim 1 wherein said webs are different.

4. A method according to Claim 1 wherein at least one of said webs is an overlay sheet.

5. A method according to Claim 1 wherein all of said webs are overlay sheets.

6. A method according to Claim 1 wherein at least one of said webs is an overlay sheet and another of said webs is a decorative sheet.

7. A method according to Claim 1 wherein at least one of said sheets is a kraft sheet.

8. A method according to Claim 1 wherein all of said webs are kraft sheets.

9. A method according to Claim 1 wherein said webs are decorative sheets of reversed face alignment.

References Cited

UNITED STATES PATENTS

| | | | |
|---|---|---|---|
| 2,640,799 | 6/1953 | Grangaard | 156—324 |
| 2,766,807 | 10/1956 | Marian | 161—413 X |
| 2,830,926 | 4/1958 | Bailey | 156—324 |
| 3,168,414 | 2/1965 | Fleissner | 117—115 X |
| 3,262,829 | 7/1966 | Conti | 156—307 |
| 3,340,118 | 9/1967 | Patterson | 156—200 |
| 3,661,673 | 5/1972 | Merriam | 156—279 |
| 3,695,967 | 10/1972 | Ross | 156—209 |

CHARLES E. VAN HORN, Primary Examiner

R. A. DAWSON, Assistant Examiner

U.S. Cl. X.R.

117—115; 156—305, 324, 335; 161—413